United States Patent
Chou et al.

(10) Patent No.: US 7,700,897 B2
(45) Date of Patent: Apr. 20, 2010

(54) HAND-HELD ELECTRIC SEALER HAVING A DETACHABLE ELECTRIC SEALING MODULE

(75) Inventors: Ammy Chou, Hsi Chih (TW); Richard Chang, Hsi Chih (TW)

(73) Assignee: Welcome Co., Ltd., Taipei (TW)

( * ) Notice: Subject to any disclaimer, the term of this patent is extended or adjusted under 35 U.S.C. 154(b) by 1084 days.

(21) Appl. No.: 11/365,513

(22) Filed: Mar. 2, 2006

(65) Prior Publication Data

US 2006/0231211 A1 Oct. 19, 2006

(30) Foreign Application Priority Data

Apr. 19, 2005 (TW) ............................. 94112407 A
Apr. 19, 2005 (TW) ............................. 94112408 A

(51) Int. Cl.
*H05B 3/02* (2006.01)

(52) U.S. Cl. ................... 219/243; 156/579; 156/583.1; 219/227

(58) Field of Classification Search ................. 219/243, 219/221, 227–230, 233, 240–244, 524, 535, 219/544; 156/579, 583.1, 379.6, 499, 515
See application file for complete search history.

(56) References Cited

U.S. PATENT DOCUMENTS

| 5,142,123 A | 8/1992 | Chou ........................ 219/243 |
| 6,326,594 B1 | 12/2001 | Chang et al. ................. 219/243 |
| 2002/0185484 A1* | 12/2002 | Chang et al. ................. 219/243 |
| 2004/0262281 A1* | 12/2004 | Chou et al. .................. 219/243 |

* cited by examiner

*Primary Examiner*—Quang T Van
*Assistant Examiner*—Jianying Atkisson
(74) *Attorney, Agent, or Firm*—Bacon & Thomas, PLLC

(57) ABSTRACT

A hand-held electric sealer having a detachable sealing module, comprises a casing having a module chamber located at the front end of the casing and a battery chamber beside the module chamber, a sealing module unitarily attached to or detached from the module chamber, and a press bar pivotally fixed at the rear end of the casing. Also disclosed is a detachable sealing module for use with the hand-held electric sealer, comprising a module cover plate and a module seat plate which form an accommodating space for receiving a heating mechanism, where the top portion of the heating mechanism protrudes from the module cover plate upon being biased by a spring secured in the module seat plate.

12 Claims, 9 Drawing Sheets

HAND-HELD ELECTRIC SEALER HAVING A DETACHABLE ELECTRIC SEALING MODULE

BACKGROUND OF THE INVENTION

1. Field of the Invention

The present invention relates to electric sealers and, more particularly, to a hand-held electric sealer having a detachable sealing module.

2. Description of Related Art

Conventionally, a hand-held electric sealer used for sealing a plastic bag, such as the one disclosed in U.S. Pat. No. 6,326,594 issued to Chang et al., comprises, among other elements, a casing and a sealing mechanism which produces heat for sealing plastic bags. The sealing mechanism is mounted in the casing and includes a heat-insulating base, a heating wire, two metal locating plates, a heat-resistant cover sheet, and a compression spring. The compression spring has a bottom end fixed in the spring holder located in the casing, such that the sealing mechanism is supported on the compression spring and can be moved up and down relative to the casing. However, in case the sealing mechanism needs to be removed and replaced because, for example, the heating wire has worn out, it is time consuming for the user to take away the relevant components from the casing and put them back into the casing, together with a functional heating wire. Therefore, it is desirable to provide an improved construction for the hand-held electric sealer so as to overcome such a disadvantage.

SUMMARY OF THE INVENTION

The object of the present invention is to provide a hand-held electric sealer having a detachable sealing module, where the sealing module, as a single unit, can be attached to or detached from a casing of the electric sealer conveniently. Through this improved construction for the hand-held electric sealer, the prior art problems frequently encountered, such as a defective heating wire, can be easily and instantly solved by simply replacing the defective unit with a new sealing module. To achieve the object, the present invention comprises a casing having a module chamber located at the front end of the casing and a battery chamber located beside the module chamber, a sealing module disposed in the module chamber, and a press bar pivotally fixed at the rear end of the casing, so that when pressing down the press bar and causing a heating wire inside of the sealing module to be energized by the batteries disposed inside the battery chamber, a plastic bag placed on the heating module can be sealed. The sealing module includes a module cover plate and a module seat plate which are affixed together so as to form an accommodation space for receiving a heating mechanism including, among other elements, a heat-insulating base. The module seat plate is provided with slots for securing conductive plates, and a spring holder for receiving a spring. The heating wire is disposed along the top of the heat-insulating base and is welded, at its ends, with metal clips which are in contact with the conductive plates, whereby the conductive plates are in contact with the metal contacts touching the batteries. In operation, the press bar is pressed down and the heat-insulating base is forced to move downward, making the metal clips touch the conductive plates so as to energize the heating wire and to seal the plastic bag placed on the top of the sealing module. In the situation where the heating wire becomes defective and accordingly rendering the sealer inoperable, the only action required is to replace the existing sealing module with a new one.

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
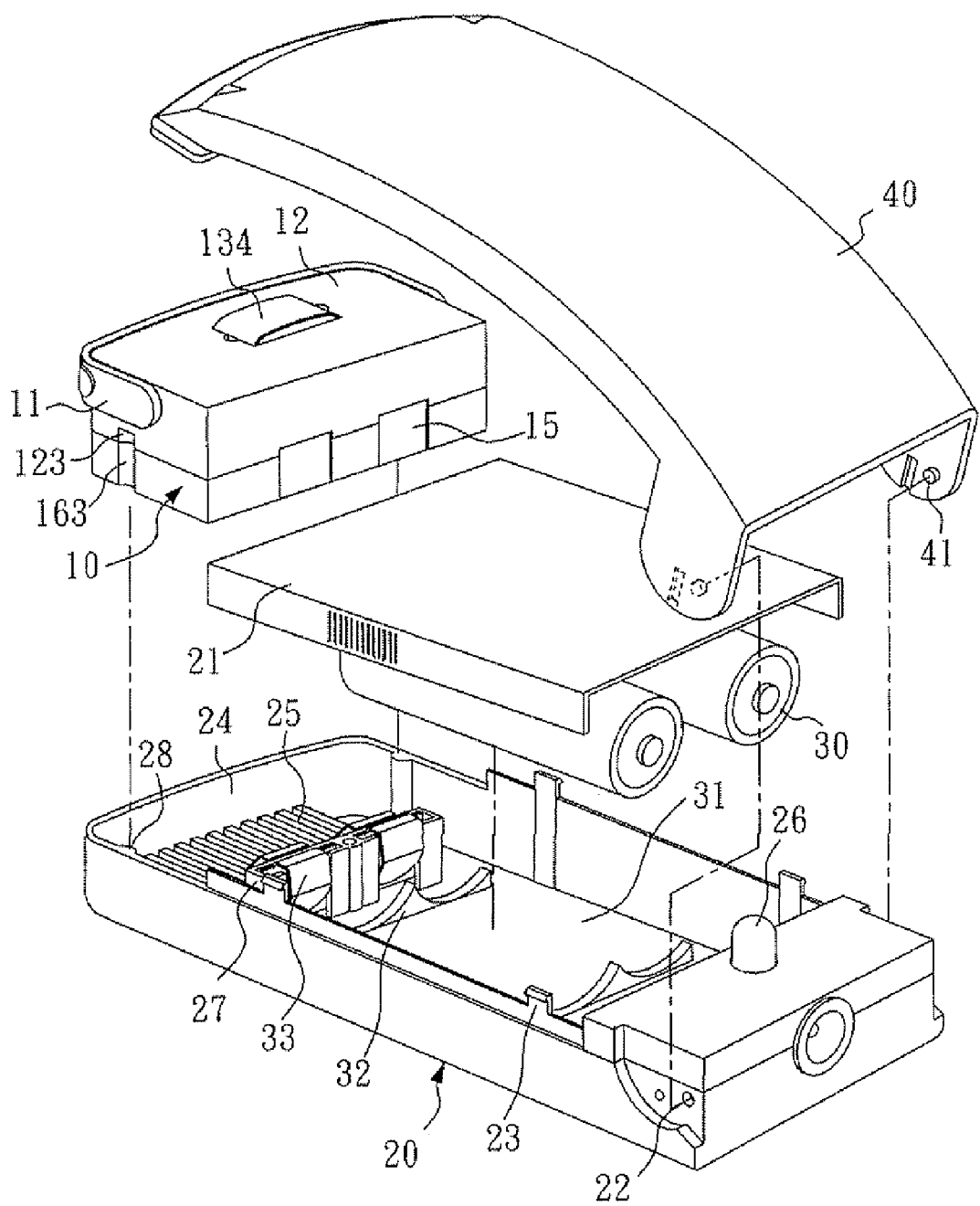
FIG. 1 is an exploded view of an electric sealer according to a first embodiment of the present invention.
Figure 2:
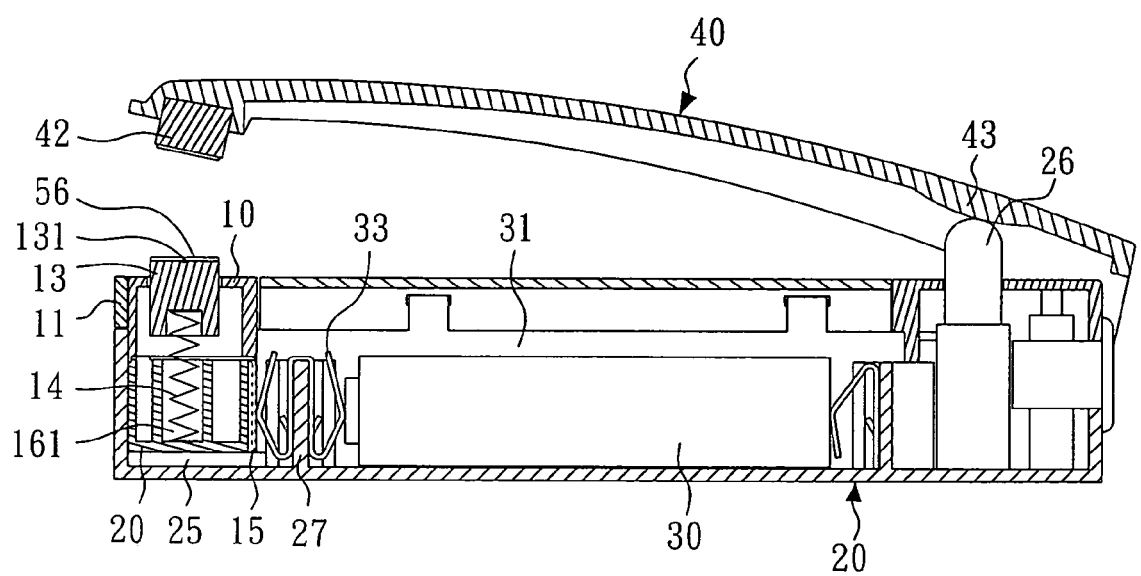
FIG. 2 is a cross-sectional view of the electric sealer in assembly according to the first embodiment of the present invention.
Figure 3:
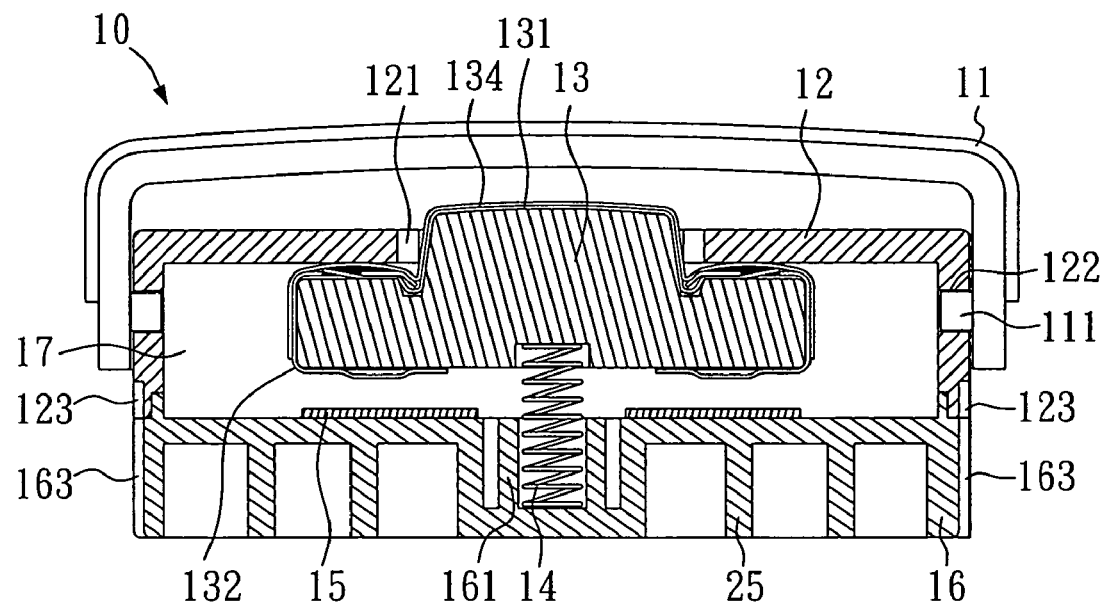
FIG. 3 is a cross-sectional view of the sealing module according to the first embodiment of the present invention, where a safety stop plate is in an upright position so as to prevent a press bar from pressing down against the sealing module unintentionally.
Figure 4:
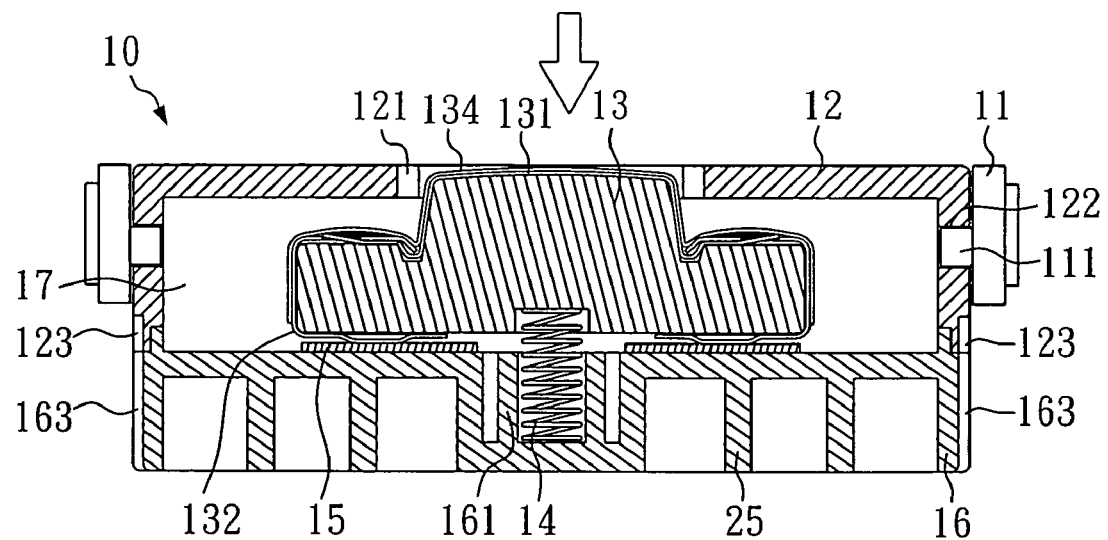
FIG. 4 is a cross-sectional view of the sealing module according to the first embodiment of the present invention, where the sealing module has been pressed down and the safety stop plate been laid down, causing a heat-insulating base to be moved down.
Figure 5:
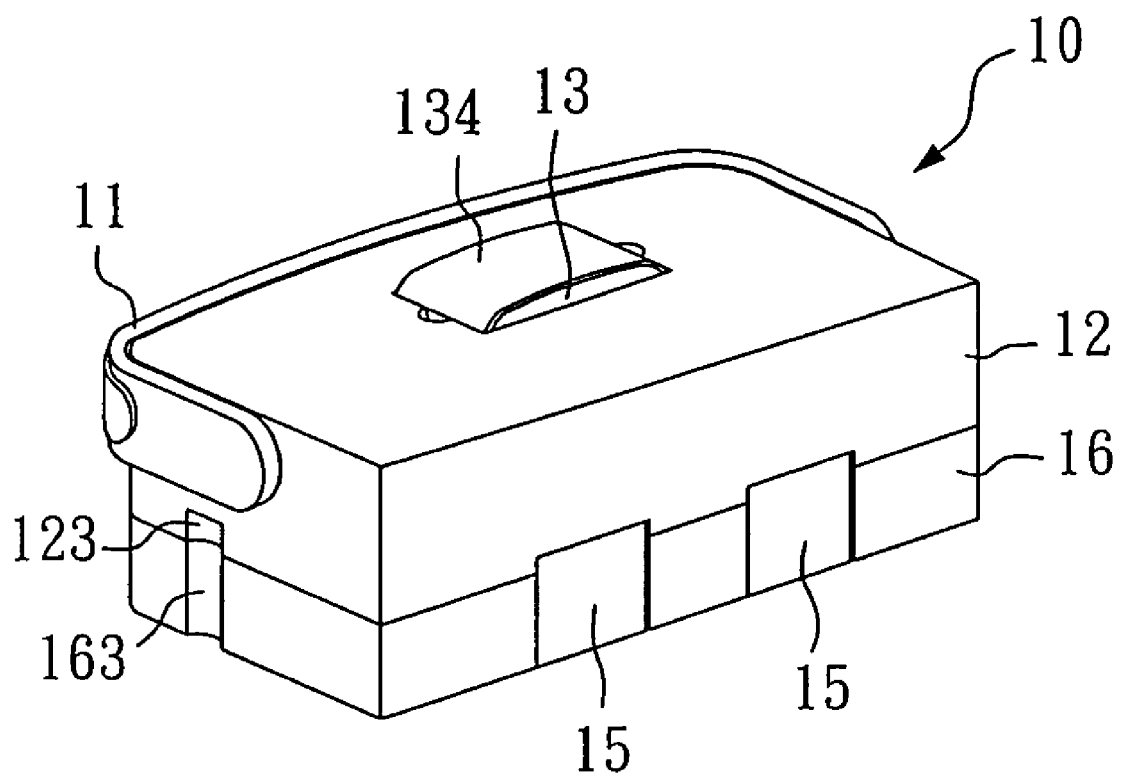
FIG. 5 is a perspective view of the sealing module according to the first embodiment of the present invention.
Figure 6:
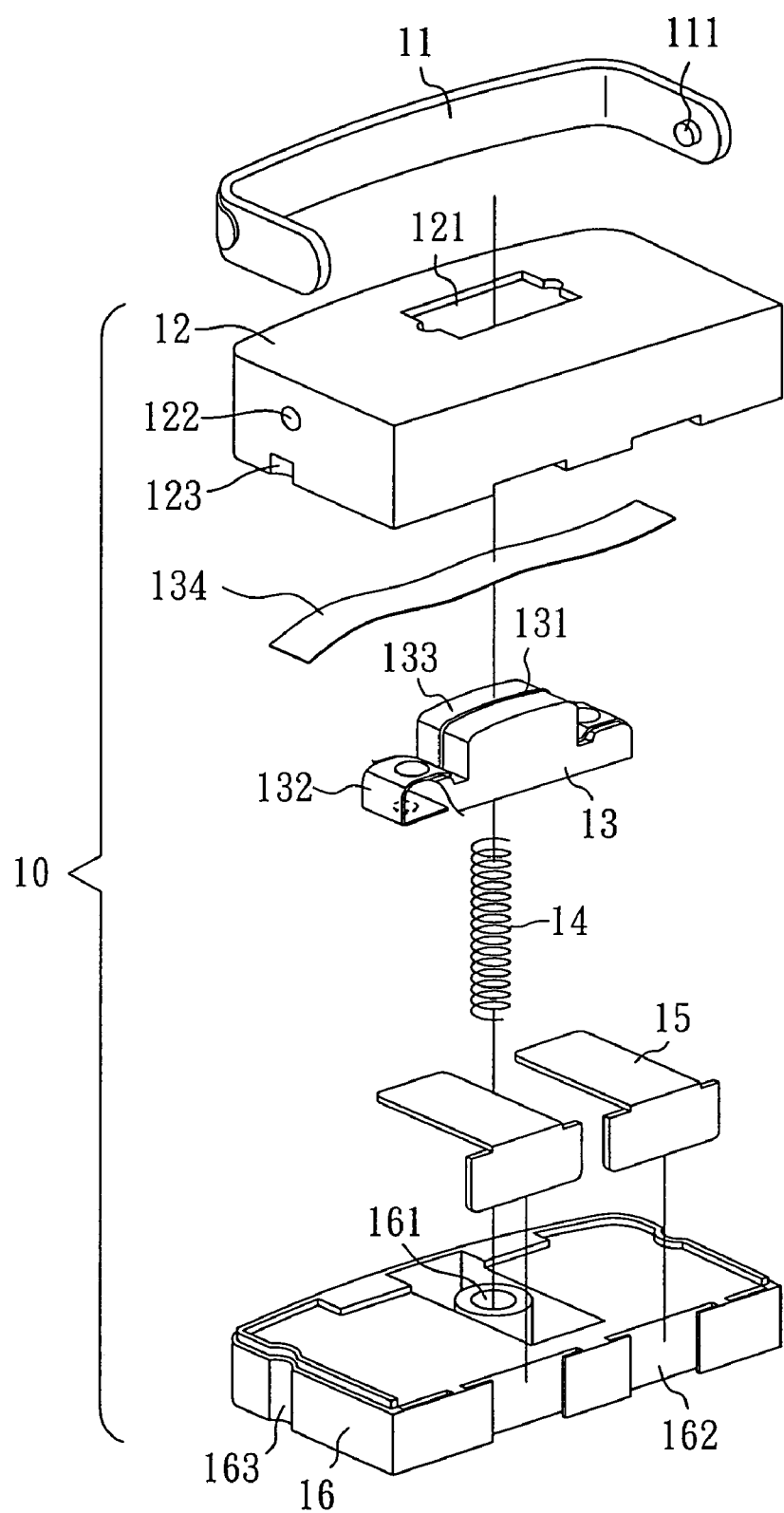
FIG. 6 is an exploded view of the sealing module according to the first embodiment of the present invention.
Figure 7:
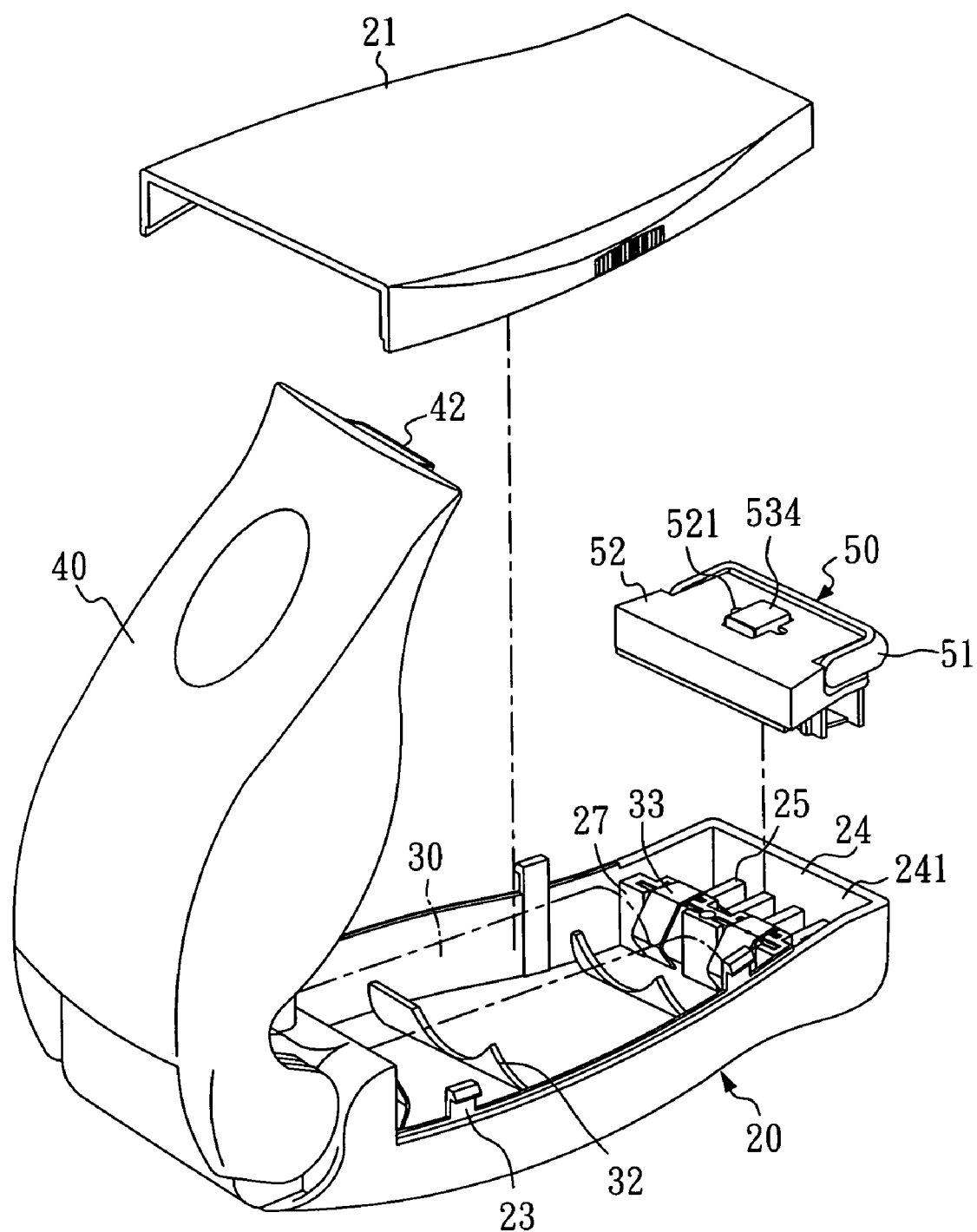
FIG. 7 is an exploded view of an electric sealer according to a second embodiment of the present invention.
Figure 8:
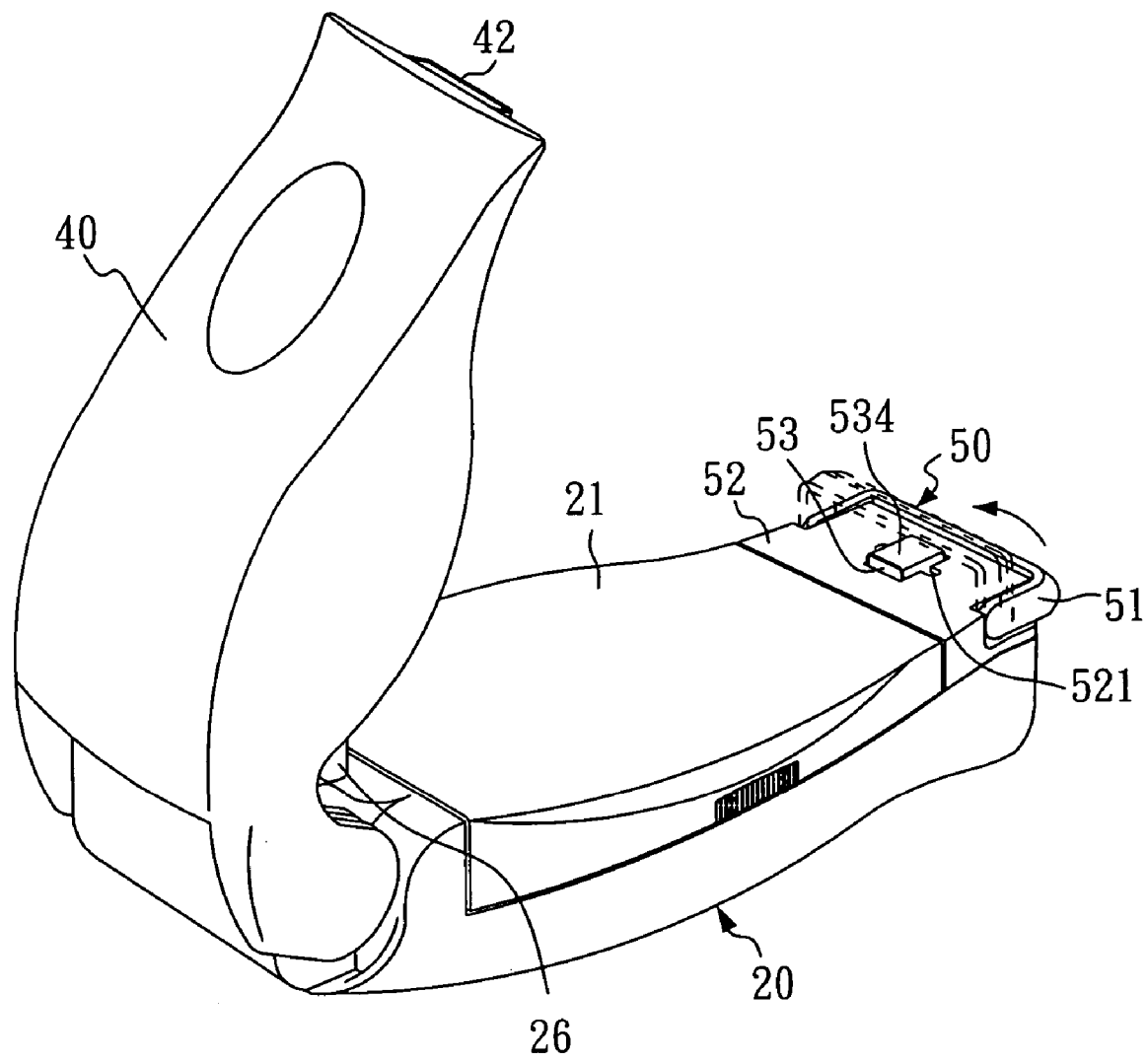
FIG. 8 is a perspective view of the electric sealer in assembly according to the second embodiment of the present invention.

As shown in FIGS. 1 and 2, the hand-held electric sealer according to the first embodiment of the present invention is equipped with a detachable sealing module 10 which, as a single unit, can be attached to or detached from a casing 20 of the electric sealer conveniently. The casing 20 has a module chamber 24 located at the front end of the casing 20 and a battery chamber 31 beside the module chamber 24, where the chambers 24, 31 are separated by a partition plate 27. The module chamber 24 receives the sealing module 10 which is supported by ribs 25 formed integrally with the casing 20, and where the battery chamber 31 receives batteries 30 which are supported by a battery holder 32 formed integrally with the casing 20. The partition plate 27 is also formed integrally with the casing 20, having metal contacts 33 attached to the partition plate 27. A battery cover plate 21, for protecting the batteries 30, is mounted on the casing 20, such that hooks 23 of the casing 20 engage with recesses (not shown) provided at the inner sides of the battery cover plate 21.

A press bar 40, having pivot pins 41 at its rear end, is pivotally fixed at the rear end of the casing 20 by locating the pivot pins 41 respectively into pivot holes 22. The front end of the press bar 40 is provided with a heat-insulating block 42 and underneath the press bar 40 there are ribs 43 formed integrally with the press bar 40. The press bar 40 is, in a normal condition when not pressed down, kept at a raised state by abutting the ribs 43 against a spring post 26, where the spring post 26 is sustained by a spring (not shown) disposed in the casing 20.

The sealing module 10, as shown in FIGS. 3 to 6, includes a module cover plate 12 and a module seat plate 16 affixed together by, for instance, gluing along the opposing edges of the plates 12, 16 so as to form an accommodating space 17 for receiving a heating mechanism. The heating mechanism includes a heat-insulating base 13, a heating wire 131, two metal clips 132, and a heat-resistant cover sheet 134, where the heating wire 131 is disposed along the top of the heat-insulating base 13 and is welded, at its ends, with the metal clips 132 which are fastened on the heat-insulating base 13. The module seat plate 16 is provided with slots 162 for securing conductive plates 15, and a spring holder 161 for securing a spring 14. The metal clips 132 can electrically contact the conductive plates 15 which are in contact with the metal contacts 33 touching the batteries 30. The heat-resistant cover sheet 134 is glued to the top surface of the heat-insulating base 13 and covers the heating wire 131 and the metal clips 132. A safety stop plate 11 is, at its ends, provided with pivot pins 111 for engaging with pivot holes 122 provided at the sides of the module cover plate 12 so that the safety stop plate 11 can pivot on the module cover plate 12. The module cover plate 12 is provided with an opening 121 which is in dimension corresponding to a contact portion 133 at the top of the heat-insulating base 13 so as to allow the contact portion 133 to protrude from the opening 121 upon the heat-insulating base 13 being biased by the spring 14 which is secured in the spring holder 161 of the module seat plate 16. The module cover plate 12 and the module seat plate 16 are provided, respectively, at the sides thereof with recesses 123, 163 for engaging with the protrusions 28 provided in the module chamber 24 of the casing 20, so that the sealing module 10 can be secured in position to the module chamber 24.

In operation, the press bar 40 is pivotally pressed down, with the heat-insulating block 42 located at the front end thereof touching the contact portion 133 at the top of the heat-insulating base 13 such that the heat-insulating base 13 is depressed to move downward. This movement overcomes the spring 14 and makes the metal clips 132 touch the conductive plates 15 (see also FIGS. 3 and 4) so as to energize the heating wire 131 by current from the batteries 30 disposed inside the battery chamber 31 and to seal a plastic bag (not shown) placed on the top of the sealing module 10. Whereas when relief occurs of the force exerting on the press bar 40, the spring 14 recovers and pushes the heat-insulating base 13 up, along with the heating mechanism back in position where the metal clips 132 depart from the conductive plates 15 and the heating wire 131 is de-energized, and the safety stop plate 11 is lifted up so as to avoid an unintentional sealing operation. In the situation where the heating wire 131 becomes defective thereby rendering the subject sealer inoperable, all that needs to be done is detach the sealing module 10, as a unit, from the module chamber 24 of the casing 20 and replace it with a new sealing module.

In the second embodiment of the present invention, as shown in FIGS. 7 to 11, the hand-held electric sealer equipped with a detachable sealing module 50, which can be attached to or detached from a casing 20 unitarily, has a similar structure and function as those of the first embodiment. As such, reference numerals for the components of the second embodiment are made almost the same as those of the first embodiment so as to avoid redundant descriptions, except for the sealing module 50 which has significant differences in structure from the sealing module 10 according to the first embodiment.

Generally speaking, the electric sealer according to the second embodiment of the present invention also comprises a casing 20 having a module chamber 24 and a battery chamber 31 separated by a partition plate 27 on which metal contacts 33 are mounted. The module chamber 24 receives the sealing module 50 which is supported by ribs 25.

Figure 9:
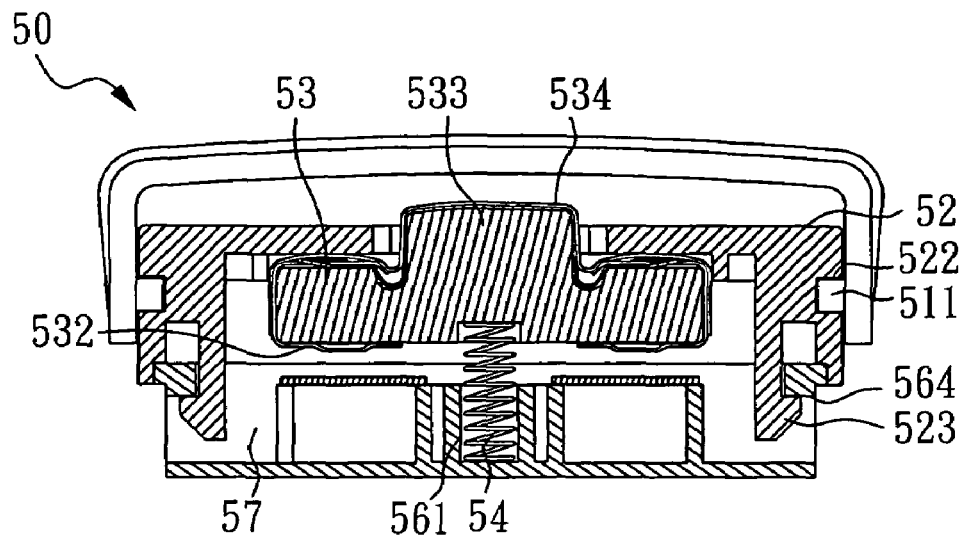
FIG. 9 is a cross-sectional view of the sealing module according to the second embodiment of the present invention, where a safety stop plate is in an upright position so as to prevent a press bar from pressing down against the sealing module unintentionally.
Figure 10:
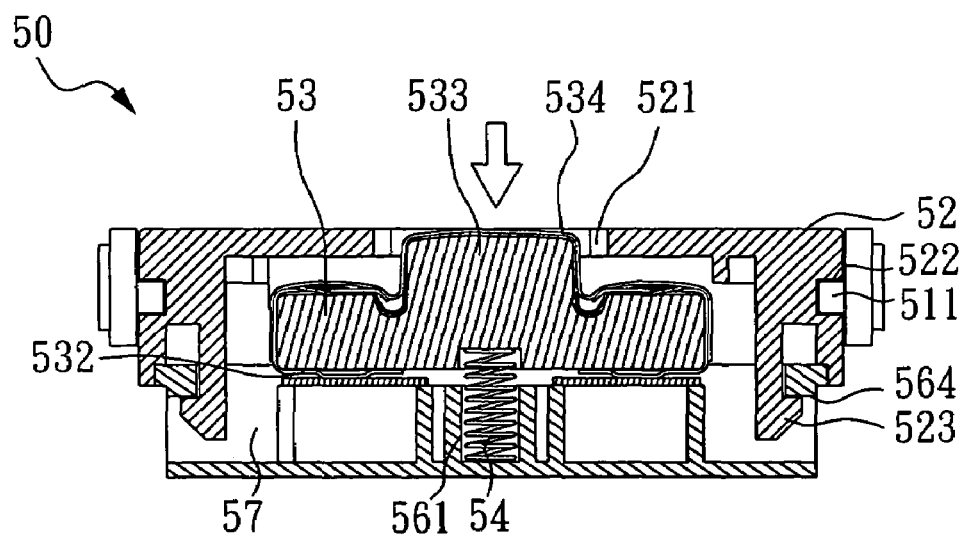
FIG. 10 is a cross-sectional view of the sealing module according to the second embodiment of the present invention, where the sealing module has been pressed down and the safety stop plate been laid down, causing a heat-insulating base to be moved down.
Figure 11:
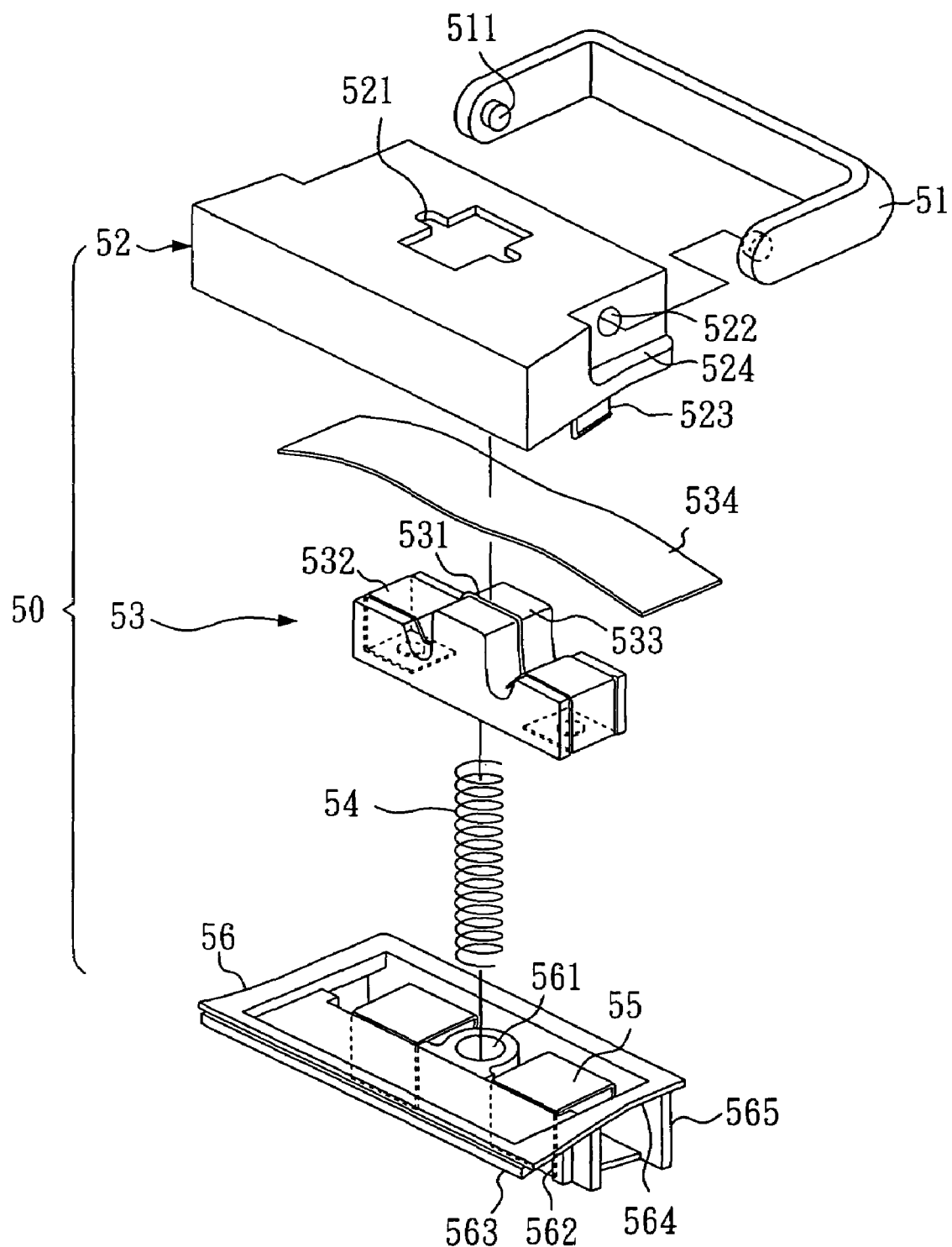
FIG. 11 is an exploded view of the sealing module according to the second embodiment of the present invention.

The sealing module 50, as shown in FIGS. 9 to 11, includes a module cover plate 52 and a module seat plate 56 affixed together so as to form an accommodating space 57 for receiving a heating mechanism. The heating mechanism includes a heat-insulating base 53, a heating wire 531, two metal clips 532, and a heat-resistant cover sheet 534, where the heating wire 531 is disposed along the top of the heat-insulating base 53 and is welded with the metal clips 532. The module seat plate 56 is provided with slots 562 for securing conductive plates 55, and a spring holder 561 for securing a spring 54. The metal clips 532 can electrically contact the conductive plates 55. The heat-resistant cover sheet 534 is glued to the top surface of the heat-insulating base 53. A safety stop plate 51 is provided with pivot pins 511 for engaging with pivot holes 522 at the sides of the module cover plate 52, and a recess 524 is respectively provided on the left and right sides of the module cover plate 52 adjacent to the pivot holes 522, such that the safety stop plate 51, when laid down, can rest in the recesses 524. The module cover plate 52 is provided with an opening 521 which is in dimension corresponding to a contact portion 533 at the top of the heat-insulating base 53 so as to allow the contact portion 533 to protrude from the opening 521. The module cover plate 52 has two hooks 523 descending respectively from the left and right sides thereof, and the module seat plate 56 has engaging portions 564 located respectively at the left and right sides of the top thereof, so that the module cover plate 52 and the module seat plate 56 are affixed together by engaging respectively the hooks 523 with the engaging portions 564. The module seat plate 56 has a wall 565 descending from the rear side thereof, and a roof portion 563 suspended from the top front thereof, so that when the sealing module 50 is accommodated into the module chamber 24 of the casing 20, the wall 565 abuts closely to the rear wall 241 of the chamber 24 and the roofing portion 563 rests on the top of the partition plate 27 of the casing 20.

Although the present invention has been explained in relation to its preferred embodiments, it is to be understood that many other possible modifications and variations can be made without departing from the scope of the invention as hereinafter claimed.

What is claimed is:

1. A hand-held electric sealer having a detachable sealing module, comprising:
    a casing, having a module chamber and a battery chamber separated from each other by a partition plate, where the battery chamber is covered with a battery cover plate and the partition plate is attached with metal contacts;
    a sealing module, unitarily attached to or detached from the module chamber of the casing, including a module cover plate and a module seat plate which together form an accommodating space for receiving a heating mechanism, where the module seat plate has a wall descending from the rear side thereof and a roof portion suspended from the top front thereof, and where the module cover plate has two hooks descending respectively from the left and right sides thereof and the module seat plate has two engaging portions located respectively at the right and left sides of the top thereof, so that the module cover plate and the module seat plate are affixed together by engaging the hooks with the engaging portions, and where the top portion of the heating mechanism protrudes from the module cover plate when the heating mechanism is biased by a spring secured in the module seat plate; and a press bar, pivotally fixed at the rear end of the casing, so that the front end of the press bar can pivotally depress the heating mechanism when the heating mechanism is biased to protrude from the module cover plate.

2. The hand-held electric sealer having a detachable sealing module as claimed in claim 1, wherein the heating mechanism of the sealing module includes a heat-insulating base, a heating wire, two metal clips, and a heat-resistant cover sheet, where the heating wire is disposed along the top of the heat-insulating base and is welded, at its ends, with the metal clips which are fastened on the heat-insulating base.

3. The hand-held electric sealer having a detachable sealing module as claimed in claim 1, wherein the module seat plate of the sealing module is provided with slots for securing conductive plates, and a spring holder for securing the spring.

4. The hand-held electric sealer having a detachable sealing module as claimed in claim 3, wherein the module cover plate of the sealing module is provided with an opening which is in dimension corresponding to a contact portion at the top portion of the heat-insulating base so as to allow the contact portion to protrude from the opening upon the heat-insulating base being biased by the spring secured in the spring holder of the module seat plate.

5. The hand-held electric sealer having a detachable sealing module as claimed in claim 1, wherein the partition plate is formed integrally with the casing.

6. The hand-held electric sealer having a detachable sealing module as claimed in claim 1, wherein the sealing module is supported by ribs formed integrally with the casing.

7. The hand-held electric sealer having a detachable sealing module as claimed in claim 1, wherein the sealing module includes a safety stop plate having pivot pins for engaging with pivot holes at the sides of the module cover plate so that the safety stop plate can pivot on the module cover plate.

8. The hand-held electric sealer having a detachable sealing module as claimed in claim 1, wherein the module cover plate is provided at the left and right sides respectively with two recesses, each recess adjacent to the respective pivot hole, such that the safety stop plate which is engaged with the module cover plate, when laid down, can rest in the recesses.

9. A detachable sealing module for use with a hand-held electric sealer, comprising a module cover plate and a module seat plate which together form an accommodating space for receiving a heating mechanism, where the module seat plate has a wall descending from the rear side thereof and a roof portion suspended from the top front thereof, and where the module cover plate has two hooks descending respectively from the left and right sides thereof and the module seat plate has two engaging portions located respectively at the right and left sides of the top thereof, so that the module cover plate and the module seat plate are affixed together by engaging the hooks with the engaging portions, and where the module seat plate has conductive plates for electrically contacting the heating mechanism and has a spring holder for securing a spring, and where the module cover plate is provided with an opening which is in dimension corresponding to the heating mechanism so as to allow the top portion of the heating mechanism to protrude from the opening when biased by the spring secured in the spring holder of the module seat plate.

10. The detachable sealing module for use with a hand-held electric sealer as claimed in claim 9, wherein the heating mechanism includes a heat-insulating base, a heating wire, two metal clips, and a heat-resistant cover sheet, where the heating wire is disposed along the top of the heat-insulating base and is welded, at its ends, with the metal clips which are fastened on the heat-insulating base.

11. The detachable sealing module for use with a hand-held electric sealer as claimed in claim 9 further comprising a safety stop plate having pivot pins for engaging with pivot holes at the sides of the module cover plate so that the safety stop plate can pivot on the module cover plate.

12. The detachable sealing module for use with a hand-held electric sealer as claimed in claim 11, wherein the module cover plate is provided at the left and right sides respectively with two recesses, adjacent to the pivot holes, such that the safety stop plate, when laid down, can rest in the recesses.

* * * * *